United States Patent
Tweet et al.

(10) Patent No.: US 10,745,144 B2
(45) Date of Patent: *Aug. 18, 2020

(54) SYSTEMS AND METHODS FOR CONTAINING IGNITION WITHIN A BATTERY HOUSING

(71) Applicant: The Boeing Company, Chicago, IL (US)

(72) Inventors: Tracy Lee Tweet, Stanwood, WA (US); Michael Kent Dove, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/842,125

(22) Filed: Dec. 14, 2017

(65) Prior Publication Data

US 2018/0105282 A1  Apr. 19, 2018

Related U.S. Application Data

(63) Continuation-in-part of application No. 14/193,002, filed on Feb. 28, 2014, now Pat. No. 9,850,000.

(51) Int. Cl.
*B64D 37/32* (2006.01)
*B64D 37/08* (2006.01)
(Continued)

(52) U.S. Cl.
CPC .............. *B64D 37/32* (2013.01); *A62C 3/065* (2013.01); *A62C 3/07* (2013.01); *A62C 3/08* (2013.01);
(Continued)

(58) Field of Classification Search
CPC ............ B64D 37/34; B64D 45/00; A62C 4/00
(Continued)

(56) References Cited

U.S. PATENT DOCUMENTS 3,199,812 A    8/1965   Spoecker
3,846,178 A *  11/1974  Evjen ...................... H01M 2/10
                                                  429/82
(Continued)

FOREIGN PATENT DOCUMENTS

CN    102698391 A    10/2012
JP     58203878 A    11/1983
(Continued)

OTHER PUBLICATIONS

Gross El, S.; Deflagaration and Detonation Flame Arrestors; Process Safety and Design, Inc.; Center for Chemical Process Safety; © 2002; 2 pages.
(Continued)

*Primary Examiner* — Jeffrey R Allen
(74) *Attorney, Agent, or Firm* — Armstrong Teasdale LLP

(57) ABSTRACT

A battery housing including a plurality of side walls oriented to define an interior, and at least one partition that subdivides the interior into at least a first battery compartment and a second battery compartment. The at least one partition defines a flame arrestor configured to provide fluid communication between the first battery compartment and the second battery compartment such that combustion gases are ventable therebetween.

20 Claims, 7 Drawing Sheets

(51) Int. Cl.
*H01M 2/10* (2006.01)
*H01M 10/44* (2006.01)
*H01M 10/48* (2006.01)
*H01M 2/12* (2006.01)
*A62C 3/08* (2006.01)
*A62C 3/16* (2006.01)
*A62C 3/06* (2006.01)
*A62C 4/00* (2006.01)
*A62C 3/07* (2006.01)
*H01M 10/42* (2006.01)
*B64D 45/00* (2006.01)

(52) U.S. Cl.
CPC ............... *A62C 3/16* (2013.01); *A62C 4/00* (2013.01); *B64D 37/08* (2013.01); *H01M 2/1077* (2013.01); *H01M 2/127* (2013.01); *H01M 10/441* (2013.01); *H01M 10/482* (2013.01); *B64D 2045/009* (2013.01); *H01M 2010/4271* (2013.01); *H01M 2200/00* (2013.01); *H01M 2220/20* (2013.01)

(58) Field of Classification Search
USPC ........................................................ 220/88.2
See application file for complete search history.

(56) References Cited

U.S. PATENT DOCUMENTS

| | | | |
|---|---|---|---|
| 4,013,190 A * | 3/1977 | Wiggins | A62C 4/00 |
| | | | 220/501 |
| 4,180,177 A | 12/1979 | Alcock et al. | |
| 4,328,901 A | 5/1982 | Gunderman et al. | |
| 4,484,690 A | 11/1984 | Nash | |
| 4,551,632 A | 11/1985 | Jourdan et al. | |
| 4,751,154 A | 6/1988 | Binder et al. | |
| 4,763,731 A | 8/1988 | Adams et al. | |
| 5,178,973 A | 1/1993 | Binder et al. | |
| 5,191,990 A | 3/1993 | Fritts | |
| 6,216,791 B1 | 4/2001 | Alhamad | |
| 6,372,983 B1 | 4/2002 | Knaggs | |
| 6,915,861 B2 | 7/2005 | Wilke et al. | |
| 2003/0218098 A1 | 11/2003 | Goto et al. | |
| 2005/0178880 A1 | 8/2005 | Howe | |
| 2005/0181152 A1 | 8/2005 | Free et al. | |
| 2006/0218934 A1 | 10/2006 | Williams et al. | |
| 2010/0116361 A1 | 5/2010 | Furuhashi et al. | |
| 2011/0056973 A1 | 3/2011 | Lynas et al. | |
| 2012/0273239 A1 | 11/2012 | Brennan | |
| 2013/0206759 A1 | 8/2013 | Wuerz et al. | |

FOREIGN PATENT DOCUMENTS

| | | |
|---|---|---|
| JP | S58212327 A | 12/1983 |
| JP | 2009082875 A | 4/2009 |
| WO | 2005079205 A2 | 9/2005 |
| WO | 2007071908 A1 | 6/2007 |

OTHER PUBLICATIONS

Extended EP Search Report for related application 15156844.1 dated Jul. 10, 2015, 4 pp.
China Office Action for related matter 201510029471.X dated May 3, 2018; 12 pp.
Chinese Office Action regarding Chinese Patent Application No. 201510029471.X dated Dec. 17, 2018 with English Translation; pp. 1-2.
Japanese Office Action regarding Japanese Patent Application No. 2014-232463 dated Sep. 21, 2018 with English Translation; pp. 1-3.

* cited by examiner

SYSTEMS AND METHODS FOR CONTAINING IGNITION WITHIN A BATTERY HOUSING

CROSS-REFERENCE TO RELATED APPLICATIONS

This application is a continuation-in-part and claims priority to U.S. patent application Ser. No. 14/193,002 filed Feb. 28, 2014, and issued as U.S. Pat. No. 9,850,000 on Dec. 26, 2017, for "SYSTEMS AND METHODS FOR CONTAINING IGNITION WITHIN EQUIPMENT DRY BAYS," which is hereby incorporated by reference in its entirety.

BACKGROUND

The field of the disclosure relates generally to equipment dry bays, and, more particularly, to mitigating effects of ignitions (e.g., explosions) that may occur in an equipment dry bay.

Fuel tanks and other systems typically include one or more equipment dry bays, such as the conventional equipment dry bay 10 shown in FIG. 1. Equipment dry bay 10 is defined by an outer wall 12 and an inner wall 14, and includes a plurality of pieces of electrical equipment 16. In the event that fuel leaks into equipment dry bay 10, faults in electrical equipment 16 may ignite the leaked fuel.

Accordingly, Federal Aviation Regulations require that areas where flammable fluids might leak include means to minimize the probability of ignition and means to minimize resultant hazards if ignition does occur. One of the hazards of an ignition occurring is that pressures within an unvented bay may increase substantially. For example, if ignition occurs in equipment dry bay 10, the pressure may increase from ambient to approximately 120 pounds per square inch absolute (psia). For normal operation, structural design pressures for equipment dry bay 10 may be much lower. Accordingly, to facilitate handling increased pressures generated by ignition, to increase strength, a typical equipment dry bay design would require additional structural material that is relatively expensive and relatively heavy.

In at least some known fuel tank assemblies, foam blocks are utilized to reduce ignition threats. The foam blocks have a cell structure that allows fuel to permeate the blocks, minimizing displacement of fuel. Further, the blocks suppress propagation of flames in the event ignition occurs. Such foam blocks may impede access to equipment and may themselves be flammable. In other known electrical enclosures, pressure generated from an ignition is vented to an external environment surrounding the enclosure. However, in some implementations, such as a fuel tank equipment bay in a pressurized cabin, it may not be feasible or desirable—or even compliant with regulations—to vent excess pressure to the surrounding environment.

BRIEF DESCRIPTION

In one aspect, a battery housing is provided. The battery housing includes a plurality of side walls oriented to define an interior, and at least one partition that subdivides the interior into at least a first battery compartment and a second battery compartment. The at least one partition defines a flame arrestor configured to provide fluid communication between the first battery compartment and the second battery compartment such that combustion gases are ventable therebetween.

In another aspect, a battery assembly is provided. The battery assembly includes a housing including an interior, and at least one partition that subdivides the interior into at least a first battery compartment and a second battery compartment. The at least one partition defines a flame arrestor configured to provide fluid communication between the first battery compartment and the second battery compartment such that combustion gases are ventable therebetween. The assembly further includes a plurality of battery cells including at least a first battery cell positioned within the first battery compartment, and at least a second battery cell positioned within the second battery compartment.

In yet another aspect, a method for containing ignitions within a battery enclosure is provided. The method includes subdividing an interior of the battery enclosure into at least a first battery compartment and a second battery compartment using at least one partition. The at least one partition defines a flame arrestor configured to provide fluid communication between the first battery compartment and the second battery compartment. The method further includes venting combustion gases from an ignition in one of the first battery compartment or the second battery compartment through the flame arrestor.

DETAILED DESCRIPTION

The systems and methods described herein provide an equipment dry bay that includes a partition. The partition subdivides the equipment dry bay into a first compartment and a second compartment. Further, the partition includes a plate and at least one flame arrestor positioned within the plate. Accordingly, in the event that an ignition occurs in the first compartment, combustion gases from the ignition vent into the second compartment through the flame arrestor. This substantially reduces pressure and temperatures generated by the ignition, and prevents the ignition from spreading to the second compartment.

Figure 2:
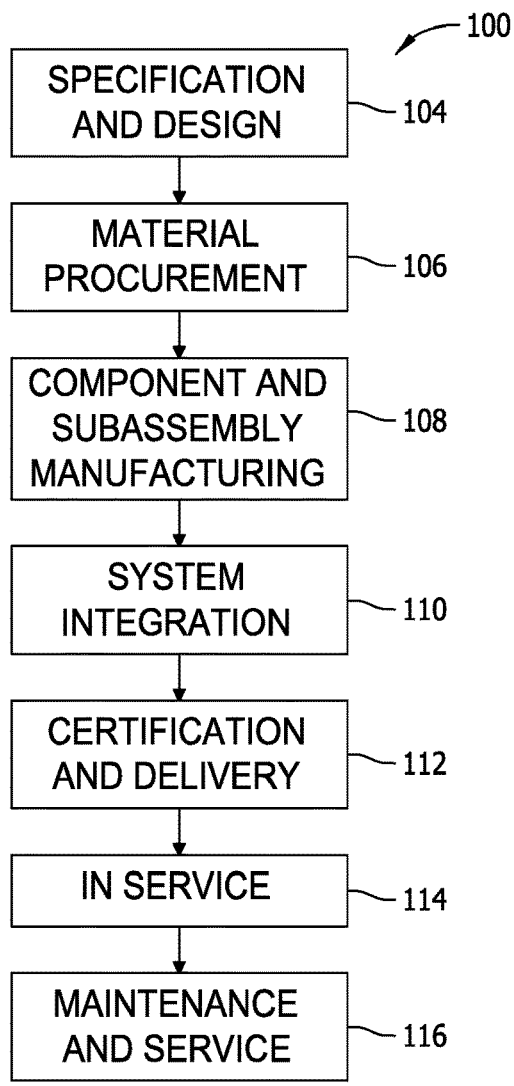
FIG. 2 is a flow diagram of an exemplary aircraft production and service methodology.
Figure 3:
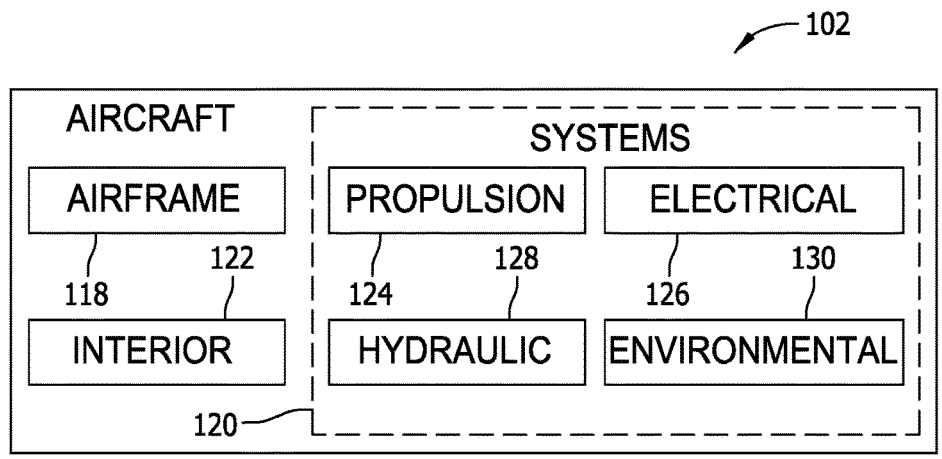
FIG. 3 is a block diagram of an aircraft.

Referring more particularly to the drawings, implementations of the disclosure may be described in the context of an aircraft manufacturing and service method 100 as shown in FIG. 2 and an aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatuses and methods implemented herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116.

Figure 1:
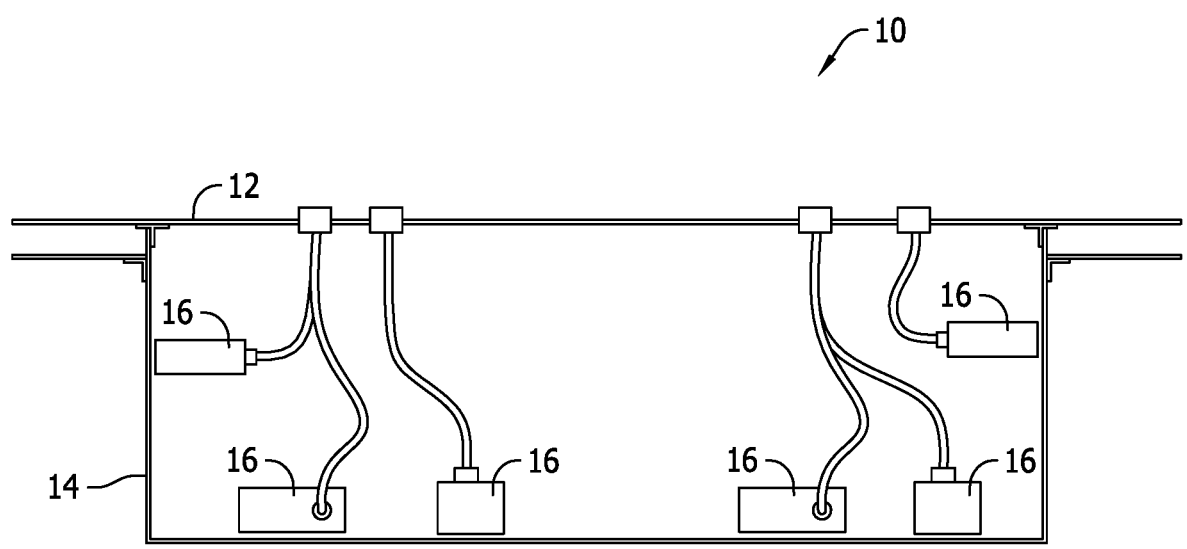
FIG. 1 is a schematic view of a known equipment dry bay.
Figure 4:
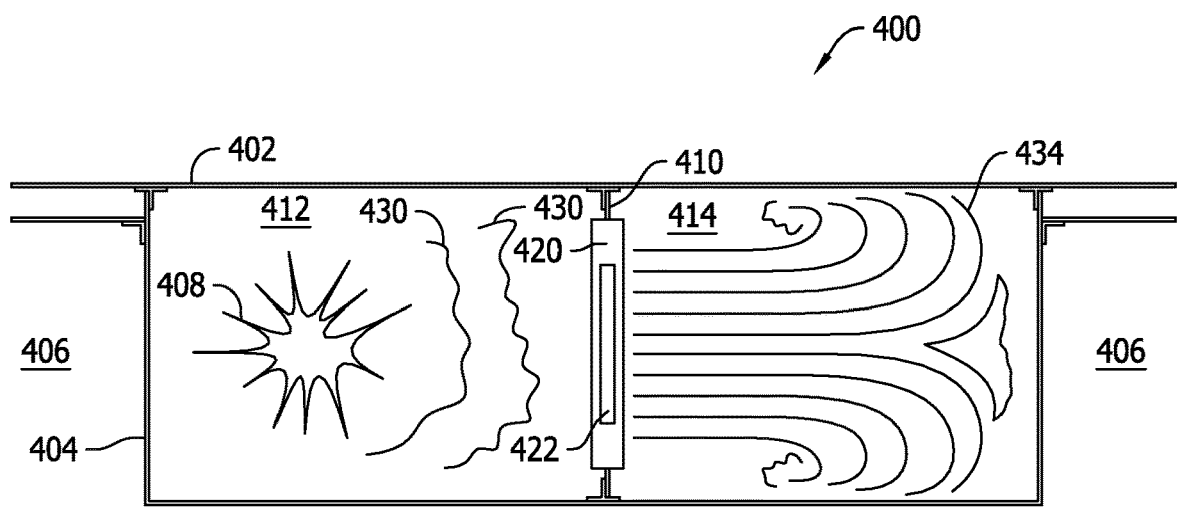
FIG. 4 is a schematic view of an exemplary equipment dry bay that includes an ignition.

FIG. 4 is a schematic view of an exemplary equipment dry bay 400. Like known equipment dry bay 10 (shown in FIG. 1), equipment dry bay 400 includes one or more pieces of electrical equipment. For clarity, however, the electrical equipment is not shown in FIG. 4. Equipment dry bay 400 is defined by an outer wall 402 and an inner wall 404. In the exemplary implementation, outer wall 402 also forms an outer wall of a fuel tank (not shown in FIG. 4), and inner wall 404 defines a fuel storage compartment 406 of the fuel tank. The fuel tank may be, for example, a fuel tank of aircraft 102 (shown in FIG. 3).

Although in the exemplary implementation, equipment dry bay 400 is implemented in a fuel tank, those of skill in the art will appreciate that equipment dry bay 400 may be implemented in a wide variety of systems that include sealed electrical enclosures. For example, equipment dry bay 400 may be a battery housing. That is, as used herein, an 'equipment dry bay' may include any sealed electrical enclosure where it may be desirable to contain and/or mitigate ignition events. Accordingly, the systems and methods described herein are not limited to use with a fuel tank.

In the exemplary implementation, equipment dry bay 400 is in proximity to fuel being stored in the fuel tank. Specifically, inner wall 404 is in contact with fuel and is wetted by fuel, forming a portion of a primary fuel barrier for equipment dry bay 400. A top of equipment dry bay 400 (i.e., at outer wall 402) forms a portion of a secondary barrier for equipment dry bay 400 and is in contact with a cabin environment. Drain lines (not shown in FIG. 4) are provided at a low point of equipment dry bay 400 to prevent pooling of fuel in the event of a leak in the primary barrier. Notably, the drain system is not essential to the effectiveness of ignition pressure mitigation.

Due to mechanical and/or electrical failure, fuel from fuel storage compartment 406 may leak into equipment dry bay 400. The leaked fuel may be ignited within equipment dry bay 400 by the electrical equipment, generating an ignition 408. For example, sparks or overheating from shorts of wires or connectors may ignite flammable vapors. As described herein, the placement of partition 410 within equipment dry bay 400 preserves separation of electrical equipment 16 from each other, and further enhances safety against ignition 408 by precluding an electrical fault on one side of partition 410 from propagating around partition 410 and causing an ignition on the other side as a result of the same failure.

In the exemplary implementation, equipment dry bay 400 includes a partition 410 that facilitates mitigating effects of ignition 408, as described herein. Specifically, partition 410 divides equipment dry bay 400 into a first compartment 412 and a second compartment 414. In the exemplary implementation, equipment dry bay 400 includes a single partition 410. Alternatively, equipment dry bay may include a plurality of partitions 410 that divide equipment dry bay 400 into more than two compartments. Partition 410 includes a plate 420 and at least one flame arrestor 422 positioned in plate 420 providing vapor/fluid communication between first and second compartments 412 and 414. In the exemplary implementation, plate 420 is a metallic (e.g., aluminum) plate. Alternatively, plate 420 may be made of any material that enables equipment dry bay 400 to function as described herein.

Ignition 408 generates combustion gases 430 that increase a pressure within equipment dry bay 400. However, partition 410 facilitates mitigating the increase in pressure and containing ignition 408. Specifically, when ignition 408 occurs in first compartment 412, combustion gases 430 are vented through partition 410 (and more specifically, through flame arrestor 422) into second compartment 414. Flame arrestor 422 is sized to provide a relatively large flow area and low pressure drop as combustion gases 430 flow therethrough. As the burning gases pass through flame arrestor 422, the energy of the combustion is extracted from the gases by contact with flame arrestor 422, snuffing out the flame and significantly lowering the temperature and pressure of combustion gases 430 exhausting to the downstream side of partition 410.

As such, flame arrestor 422 extinguishes any ignition in combustion gases 430, and combustion gases 430 are transformed into a pressure relief exhaust plume 434 in second compartment 414. This facilitates minimizing a pressure rise in first compartment 412, and allows a nearly uniform average pressure to be created in both first and second compartments 412 and 414. For example, in an unpartitioned equipment dry bay, such as equipment dry bay 10 (shown in FIG. 1), the pressure may increase from ambient pressure to 125 pounds per square inch absolute (psia) in the event of an ignition. However, in the partitioned equipment dry bay 400, the pressure may increase to no more than approximately 37 psia. More specifically, in some implementations, the peak pressure generated from ignition 408 is in a range from approximately 29 to 33 psia against a baseline ambient pressure of 14.7 psia.

Accordingly, by venting high temperature, high pressure combustion gases 430 through flame arrestor 422, the pressure increase generated by ignition 408 is substantially mitigated. Further, due to the relatively large low pressure drop, flame arrestor 422 may also facilitate cooling combustion gases 430 as they pass therethrough. Moreover, flame arrestor 422 prevents ignition 408 from expanding from first compartment 412 to second compartment 414, thus denying deflagration of a large proportion of the flammable mixture present in equipment dry bay 400. As such, ignition 408 is contained within first compartment 412, and electronic equipment in second compartment 414 is not damaged by ignition 408. Notably, combustion gases 430 are not vented to an exterior of equipment dry bay 400 and the pressure reduction achieved above is substantial enough to bring peak ignition pressures within the bounds of other structural design limits.

Figure 5:
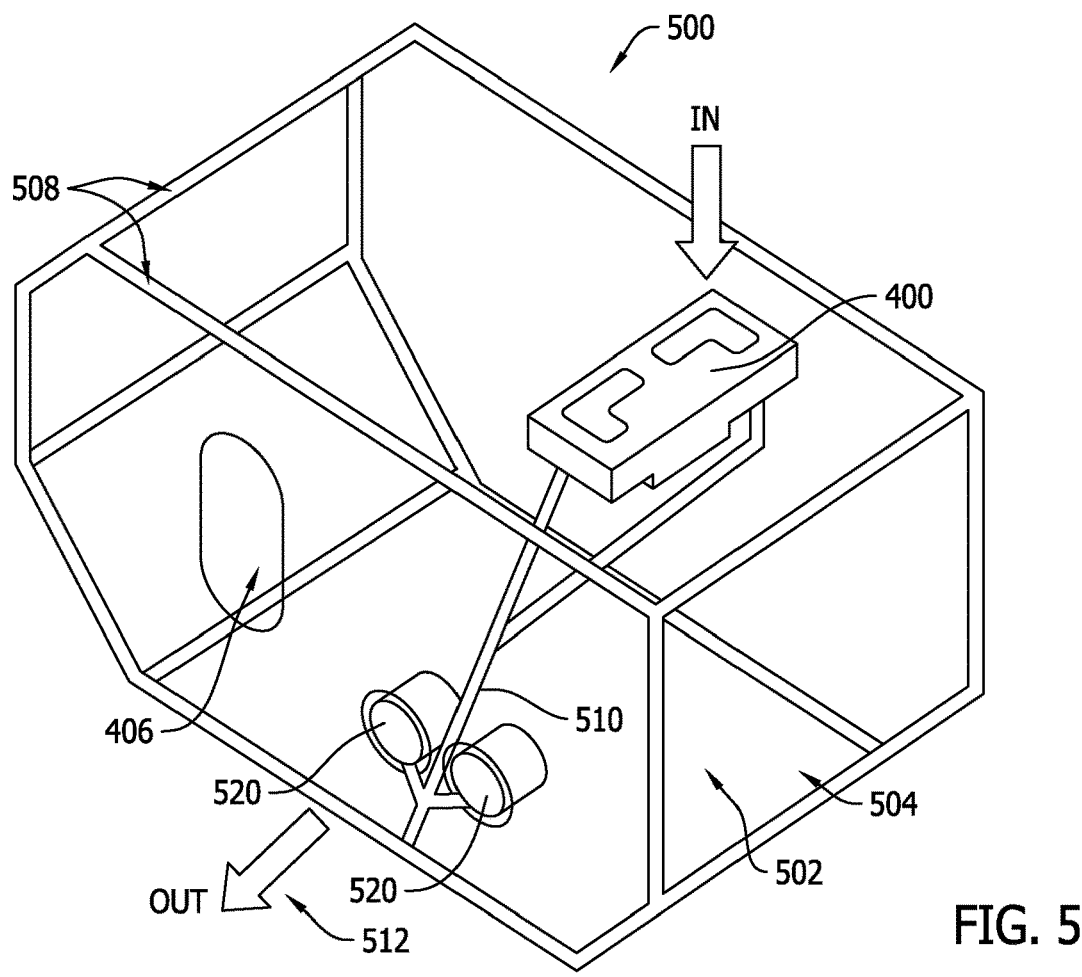
FIG. 5 is a perspective schematic view of an exemplary fuel tank that may use the equipment dry bay shown in FIG. 4.
Figure 6:
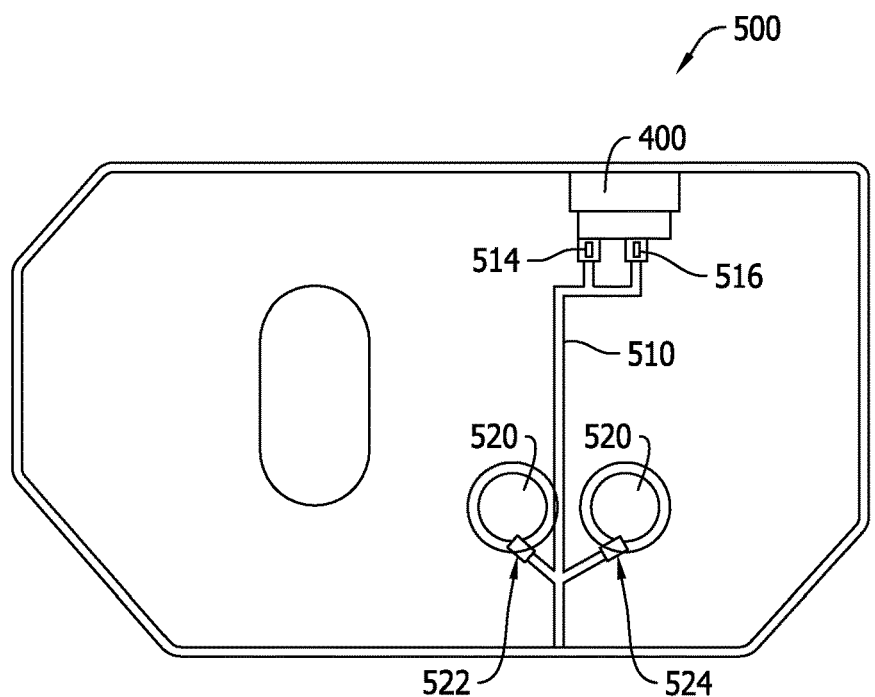
FIG. 6 is a side schematic view of the fuel tank shown in FIG. 5.

FIG. 5 is a perspective schematic view of an exemplary fuel tank 500 that may include equipment dry bay 400. FIG. 6 is a side schematic view of fuel tank 500. In the exemplary implementation, fuel tank 500 includes an outer surface 502 that is formed from a honeycomb core material 504 extending between corner voids 508. As shown in FIG. 5, a majority of the volume defined by fuel tank 500 is dedicated to fuel storage compartment 406.

To remove any fuel that leaks into equipment dry bay 400, vent and drain lines 510 are in flow communication with and extend from first and second compartments 412 and 414 such that leaked fuel flows to an outlet 512. In the exemplary implementation, a first external flame arrestor 514 is located at the interface between first compartment 412 and lines 510, and a second external flame arrestor 516 is located at the interface between second compartment 414 and lines 510. Accordingly, if ignition 408 occurs in first or second compartment 412 or 414, ignition 408 does not spread to lines 510.

Vent and drain lines 510 are also in flow communication with one or more pump dry bays 520 to facilitate draining fuel that has leaked into pump dry bays 520. In the exemplary implementation, fuel tank 500 includes two pump dry bays 520. Alternatively, fuel tank 500 may include any number of pump dry bays 520 that enables fuel tank 500 to function as described herein. Pump dry bays 520 may include valves, sensors, pumps, and/or other equipment used during operation of fuel tank 500.

In the exemplary implementation, a third flame arrestor 522 is located at the interface between one pump dry bay 520 and lines 510, and a fourth flame arrestor 524 is located at the interface between the other pump dry bay 520 and lines 510. Accordingly, if ignition 408 occurs in one of pump dry bays 520, ignition 408 does not spread to lines 510. In some implementations, pump dry bays 520 may also be coupled to one another using a partition similar to partition 410 (shown in FIG. 4). In such implementations, combustion gases 430 from an ignition 408 in one pump dry bay 520 will be vented to the other pump dry bay 520.

Figure 7:
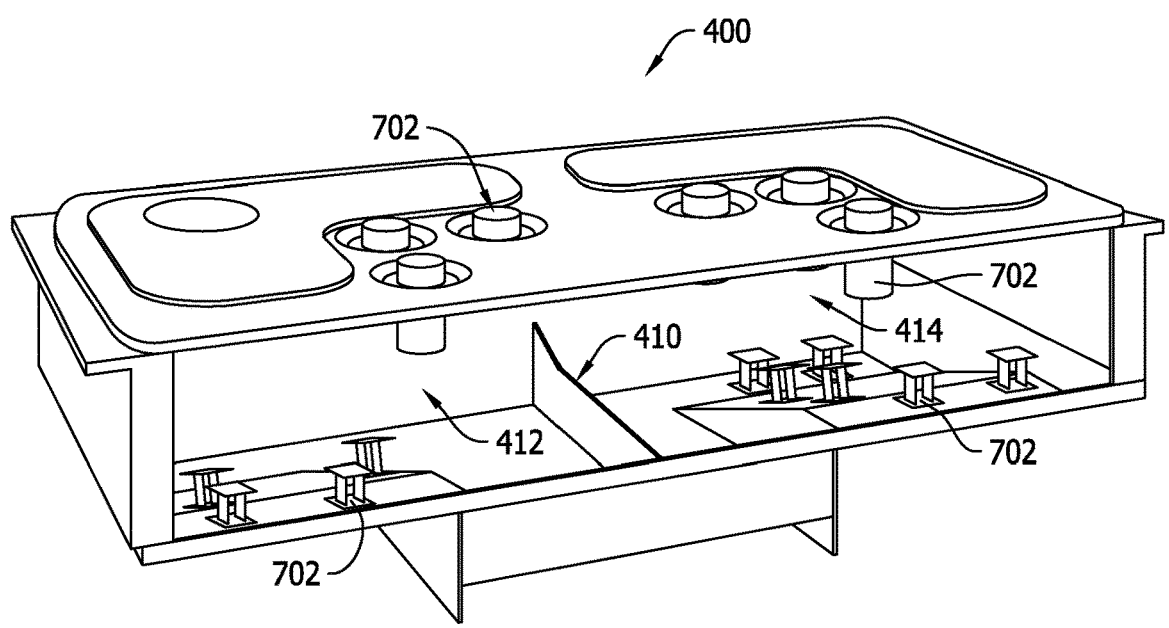
FIG. 7 is a perspective cut-away view of the equipment dry bay shown in FIG. 4.

FIG. 7 is a perspective cut-away view of equipment dry bay 400. For clarity, a front panel of equipment dry bay 400 is omitted and only a portion of partition 410 is shown in FIG. 7. Equipment dry bay 400 includes a plurality of electrical components 702. As explained above, a fault in one of electrical components 702 may generate an ignition in first or second compartments 412 and 414. However, partition 410 contains the combustion in the compartment in which the ignition was generated, and facilitates preventing the ignition from spreading to the other compartment.

Figure 8:
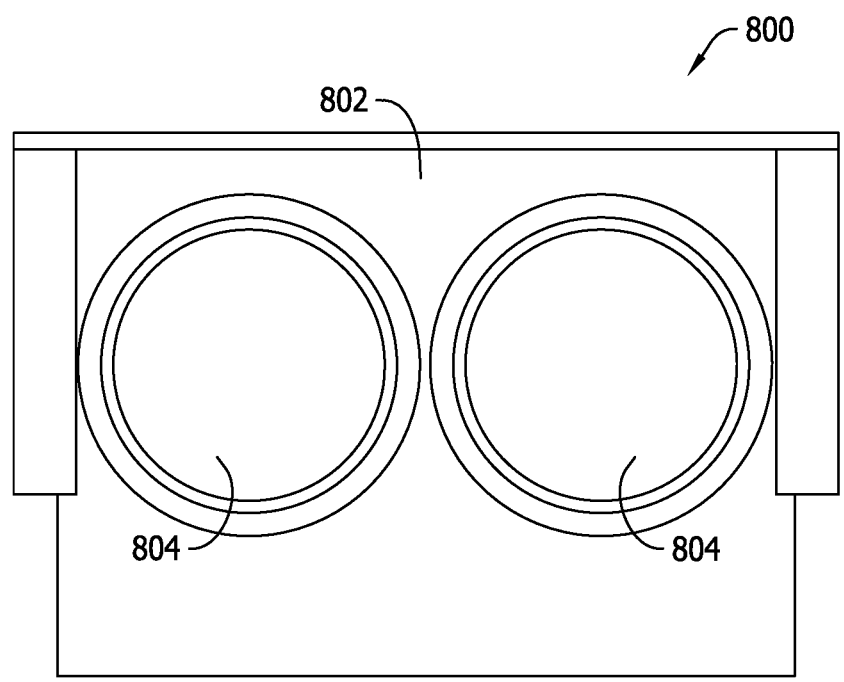
FIG. 8 is a front view of an exemplary partition with flame arrestors that may be used with the equipment dry bay shown in FIG. 4.

FIG. 8 is a front view of an exemplary partition 800 that may be used with equipment dry bay 400 (shown in FIGS. 4 and 7). In the exemplary implementation, partition 800 includes a plate 802 and two flame arrestors 804 positioned in plate 802. In the exemplary implementation, plate 802 is a metallic (e.g., aluminum) plate. Alternatively, plate 802 may be made of any material that enables partition 800 to function as described herein. As shown in FIG. 8, flame arrestors 804 are substantially cylindrical, and are aligned with one another (i.e., positioned at the same height on plate 802). Alternatively, partition 800 may include any number of flame arrestors 804 having any shape and/or any orientation that allows partition 800 to function as described herein. For example, the number of flame arrestors 804 may be selected to facilitate optimizing a ratio between a surface area of flame arrestors 804 and a volume of first and second compartments 412 and 414.

Further, in some implementations, partition 800 includes tubes or passages with flame arrestors 804 positioned therein. Alternatively, partition 800 may be configured from any material matrix that effectively extinguishes the flame while allowing free flow of combustion gases across the partition with minimal pressures loss. Moreover, in some implementations, partition 800 may be a structure integral to equipment dry bay 400 such that plate 802 is not a removable fastened structure, but rather an integrally machined rib and/or partition. Further, partition 800 may be a structure whose primary function is structural strength for equipment dry bay 400 or the structure in which equipment dry bay 400 is situated, apart from the pressures generated by an ignition. Notably, partition 800 with flame arrestors 804 might be used in structures where a flammable atmosphere may be present concurrently with ignition sources other than electrical equipment (e.g., lightning, combat threats, etc.).

Figure 9:
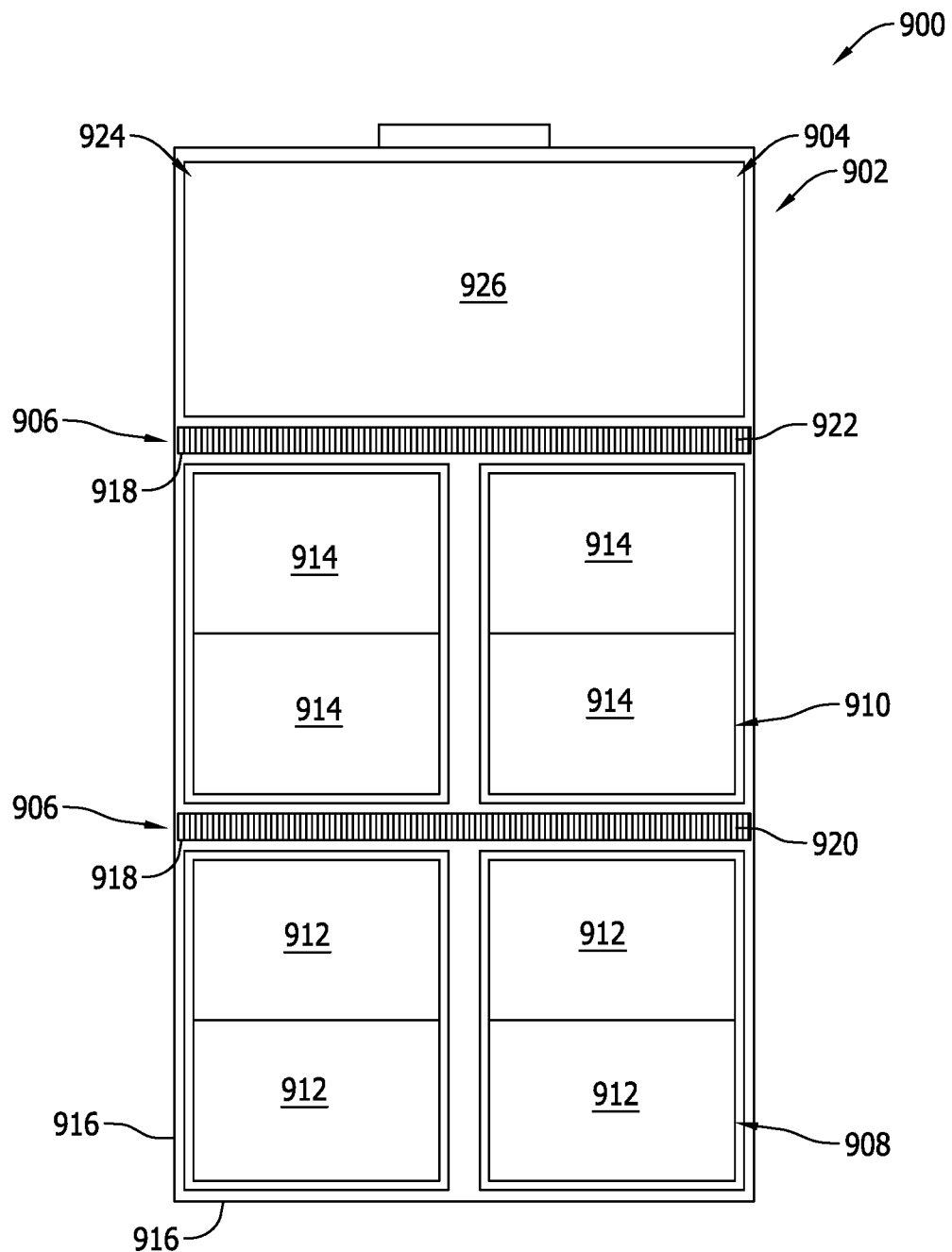
FIG. 9 is a schematic illustration of an exemplary battery assembly.

FIG. 9 is a schematic illustration of an exemplary battery assembly 900. In the exemplary implementation, battery assembly 900 includes a housing 902 having an interior 904, and at least one partition 906 that subdivides interior 904 into at least a first battery compartment 908 and a second battery compartment 910. Battery assembly 900 also includes a plurality of battery cells including at least one first battery cell 912 positioned within first battery compartment 908, and at least one second battery cell 914 positioned within second battery compartment 910. Example battery cells include, but are not limited to, lithium-ion battery cells.

In the exemplary implementation, housing 902 includes a plurality of side walls 916 oriented to define interior 904. Side walls 916 are coupled together such that housing 902 is sealed from a surrounding environment. Put another way, housing 902 is sealed such that no venting of combustion gases from interior 904 is required to contain an ignition in one of first battery compartment 908 or second battery compartment 910. In addition, housing 902 is adapted to withstand an ignition pressure of up to about 20 pounds per square inch, gauge (psig). As such, a low weight housing capable of mitigating the effects of an unexpected ignition event is provided.

In the exemplary implementation, the at least one partition 906 defines a flame arrestor 918 that provides fluid (e.g., both vapor and liquid) communication between first battery compartment 908 and second battery compartment 910 such that combustion gases are ventable therebetween. Similar to flame arrestor 422 (shown in FIG. 4), flame arrestor 918 provides a relatively large flow area and low pressure drop as combustion gases flow therethrough. As the combustion gases pass through partition 906, the energy of the combustion is extracted from the gases by contact with the material used to form flame arrestor 918, thereby snuffing out the flame and significantly lowering the temperature and pressure of the combustion gases. Flame arrestor 918 is fabricated from any flame-arresting matrix material that enables battery assembly 900 to function as described herein. Example materials include, but are not limited to, a hex-cell structure, a metallic wool material, or a reticulated foam material. In some embodiments, partition 906 is formed entirely from the material of flame arrestor 918, such that partition 906 and flame arrestor 918 are co-extensive. In other embodiments, partition 906 includes a substrate formed from another material, such as sheet metal, and flame arrestor 918 is coupled to the substrate, such as within an opening formed through the substrate.

In one implementation, the at least one partition 906 includes a first partition 920 and a second partition 922. More specifically, first partition 920 subdivides interior 904 into first battery compartment 908 and second battery compartment 910, and second partition 922 further subdivides interior 904 to define a battery monitoring unit compartment 924. First partition 920 and second partition 922 are oriented such that first battery compartment 908, second battery compartment 910, and battery monitoring unit compartment 924 are arranged in a serial relationship (i.e., arranged back-to-back in succession, such that first battery compartment 908 is not adjacent to battery monitoring unit compartment 924). As such, first battery compartment 908 is ventable through first partition 920, and second battery compartment 910 is ventable through both first partition 920 and second partition 922 in the event an ignition occurs therein, respectively.

Battery assembly 900 further includes a battery monitoring unit 926 positioned within battery monitoring unit compartment 924 of interior 904. Battery monitoring unit 926 is operable to control the charge and discharge of the plurality of battery cells, for example. Battery monitoring unit 926 also provides cell protection, cell monitoring, and built-in testing for the plurality of battery cells. As noted above, battery monitoring unit compartment 924 is partitioned from second battery compartment 910 such that battery monitoring unit 926 is isolated against flame propagation in the event an ignition occurs in second battery compartment 910.

Figure 10:
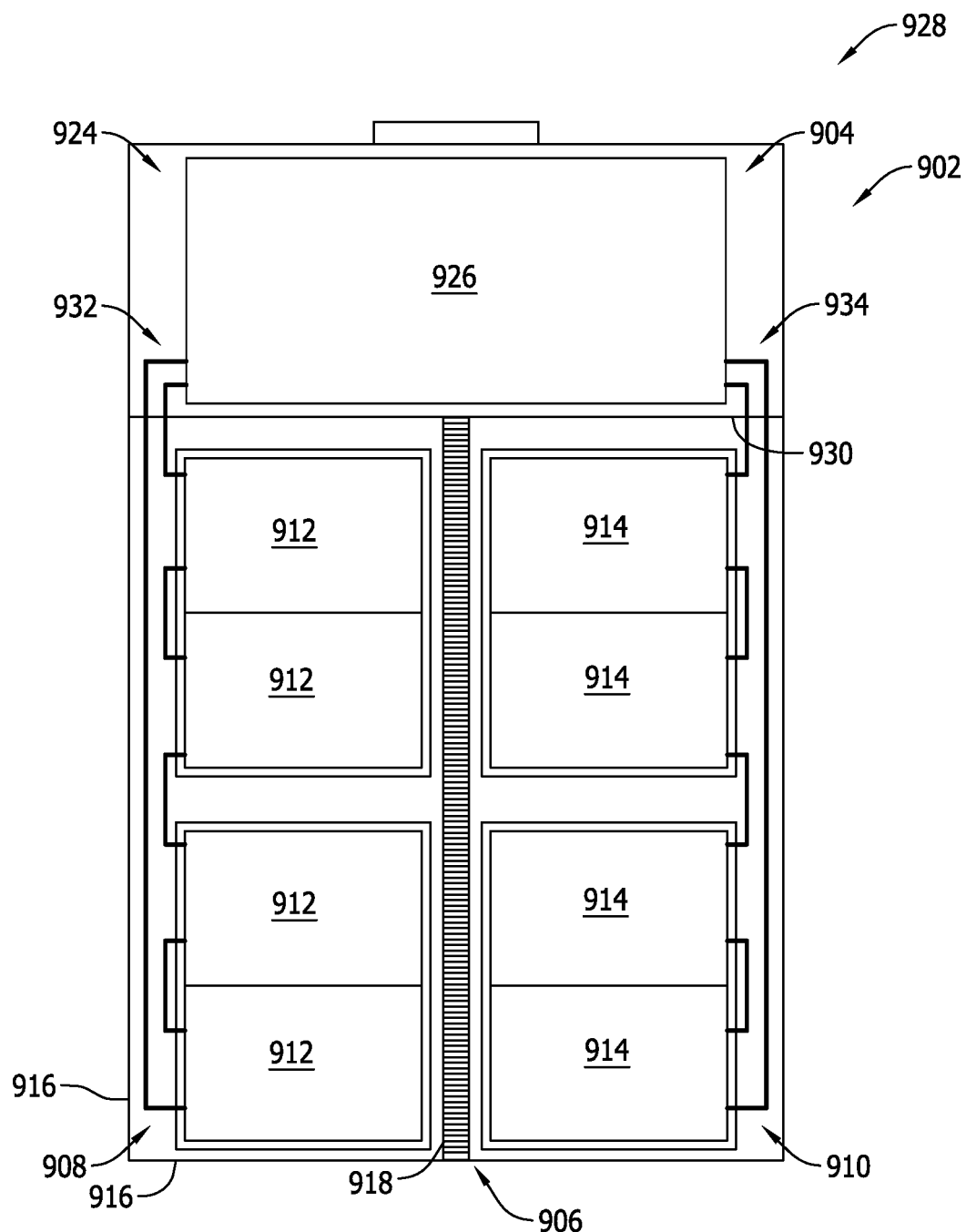
FIG. 10 is a schematic illustration of an alternative battery assembly.

FIG. 10 is a schematic illustration of an alternative battery assembly 928. In the exemplary implementation, battery assembly 928 includes partition 906 and an interior wall 930 that further subdivides interior 904 to define battery monitoring unit compartment 924. Partition 906 and interior wall 930 are oriented such that first battery compartment 908 and second battery compartment 910 are both adjacent battery monitoring unit compartment 924. As such, first battery cells 912 and second battery cells 914 are positionable in a manner that facilitates enabling partition 906 to restrict propagation of an electrical fault between first battery compartment 908 and second battery compartment 910 in an efficient and space-saving manner.

For example, battery assembly 928 further includes a plurality of electrical circuits, including a first electrical circuit 932 coupled between first battery cells 912 and battery monitoring unit 926, and a second electrical circuit 934 coupled between second battery cells 914 and battery monitoring unit 926. First electrical circuit 932 and second electrical circuit 934 are electrically isolated from each other within respective compartments of first battery compartment 908 and second battery compartment 910. More specifically, both first electrical circuit 932 and second electrical circuit 934 do not cross partition 906, thereby reducing the likelihood of a simultaneous electrical fault from occurring.

The implementations described herein provide an equipment dry bay that includes a partition. The partition subdivides the equipment dry bay into a first compartment and a second compartment. Further, the partition includes a plate and at least one flame arrestor positioned within the plate. Accordingly, in the event that an ignition (e.g., an explosion) occurs in the first compartment, combustion gases from the ignition vent into the second compartment through the flame arrestor. This reduces pressure generated by the ignition, and prevents the ignition from spreading to the second compartment.

The implementations of equipment dry bays described herein provide improvements over at least some known battery assemblies. As compared to at least some known battery assemblies, the equipment dry bay implementation of a battery assembly described herein includes a partition with a flame arrestor that facilitates venting combustion gases from an ignition in one compartment into a second compartment. Venting the combustion gases significantly reduces the pressures generated by the ignition as compared with at least some known battery assemblies. Accordingly, unlike at least some known battery assemblies, the equipment dry bay implementation of a battery assembly described herein does not require additional expensive and heavy material that can withstand higher pressures. Further, the partition facilitates limiting the ignition to only a portion of the battery assembly, preventing damage to at least some cells and electrical circuitry in the battery assembly. This enhances redundancy where cells and circuitry on each side of the partition are redundant systems. Furthermore, electrical separation of systems separated by the partition (such that no circuit crosses the partition), whether redundant or otherwise, prevents an electrical fault (e.g., hot short) on one side of the partition from simultaneously occurring on the other side.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. For example, it should be apparent that an alternate implementation to that described in FIG. 10 might include a second partition forming a third battery cell compartment containing a third bank of cells that can be wired into the control module in parallel with the other cells 912 and 914. Such expansions of the basic design concept may increase battery capacity while further protecting against ignition pressures, within the scope of this disclosure. Such other examples are intended to be within the scope of the claims if they have structural elements that do not differ from the literal language of the claims, or if they include equivalent structural elements with insubstantial differences from the literal language of the claims.

What is claimed is:

1. A battery housing comprising:
   a plurality of side walls oriented to define an interior; and
   at least one partition that subdivides said interior into at least a first battery compartment and a second battery compartment, wherein said at least one partition defines a flame arrestor configured to provide fluid communication between said first battery compartment and said second battery compartment such that combustion gases are ventable therebetween, wherein said at least one partition is configured to restrict propagation of an electrical fault between said first battery compartment and said second battery compartment.

2. The battery housing in accordance with claim 1, wherein said flame arrestor is formed from a material including at least one of a hex-cell structure, a metallic wool material, and a reticulated foam material.

3. The battery housing in accordance with claim 1, wherein said at least one partition comprises a first partition that subdivides said interior into said first battery compartment and said second battery compartment, and a second partition that further subdivides said interior to define a battery monitoring unit compartment.

4. The battery housing in accordance with claim 3, wherein said first partition and said second partition are oriented such that said first battery compartment, said second battery compartment, and said battery monitoring unit compartment are arranged in a serial relationship.

5. The battery housing in accordance with claim 1 further comprising an interior wall that further subdivides said interior to define a battery monitoring unit compartment, wherein said at least one partition and said interior wall are oriented such that said first battery compartment and said second battery compartment are both adjacent said battery monitoring unit compartment.

6. The battery housing in accordance with claim 1, wherein said flame arrestor is configured to vent combustion gases from an ignition in one of said first battery compartment or said second battery compartment, wherein said battery housing is adapted to withstand an ignition pressure of up to about 20 pounds per square inch, gauge.

7. A battery assembly comprising:
a housing comprising an interior;
at least one partition that subdivides said interior into at least a first battery compartment and a second battery compartment, wherein said at least one partition defines a flame arrestor configured to provide fluid communication between said first battery compartment and said second battery compartment such that combustion gases are ventable therebetween, wherein said at least one partition is configured to restrict propagation of an electrical fault between said first battery compartment and said second battery compartment; and
a plurality of battery cells comprising at least a first battery cell positioned within said first battery compartment, and at least a second battery cell positioned within said second battery compartment.

8. The battery assembly in accordance with claim 7 further comprising a battery monitoring unit positioned within said interior.

9. The battery assembly in accordance with claim 8, wherein said at least one partition comprises a first partition that subdivides said interior into said first battery compartment and said second battery compartment, and a second partition that further subdivides said interior to define a battery monitoring unit compartment configured to receive said battery monitoring unit therein.

10. The battery assembly in accordance with claim 9, wherein said first partition and said second partition are oriented such that said first battery compartment, said second battery compartment, and said battery monitoring unit compartment are arranged in a serial relationship.

11. The battery assembly in accordance with claim 7 further comprising a plurality of electrical circuits that comprises a first electrical circuit coupled between said at least first battery cell and said battery monitoring unit, and a second electrical circuit coupled between said at least second battery cell and said battery monitoring unit, wherein said first electrical circuit and said second electrical circuit are electrically isolated from each other within respective compartments of said first battery compartment and said second battery compartment.

12. The battery assembly in accordance with claim 8 further comprising an interior wall that further subdivides said interior to define a battery monitoring unit compartment configured to receive said battery monitoring unit, wherein said at least one partition and said interior wall are oriented such that said first battery compartment and said second battery compartment are both adjacent said battery monitoring unit compartment.

13. The battery assembly in accordance with claim 7, wherein said flame arrestor is formed from a material including at least one of a hex-cell structure, a metallic wool material, and a reticulated foam material.

14. A method for containing a battery enclosure, said method comprising:
subdividing an interior of the battery enclosure into at least a first battery compartment and a second battery compartment using at least one partition, wherein the at least one partition defines a flame arrestor configured to provide fluid communication between the first battery compartment and the second battery compartment;
restricting propagation of an electrical fault between the first battery compartment and the second battery compartment using the at least one partition; and
venting combustion gases from an ignition in one of the first battery compartment or the second battery compartment through the flame arrestor.

15. The method in accordance with claim 14, wherein the at least one partition includes a first partition and a second partition, wherein subdividing an interior comprises subdividing the interior using the first partition that subdivides the interior into the first battery compartment and the second battery compartment, and the second partition that further subdivides the interior to define a battery monitoring unit compartment.

16. The method in accordance with claim 15, wherein subdividing the interior further comprises orienting the first partition and the second partition such that the first battery compartment, the second battery compartment, and the battery monitoring unit compartment are arranged in a serial relationship.

17. The method in accordance with claim 14 further comprising subdividing the interior to define a battery monitoring unit compartment using an interior wall, wherein the at least one partition and the interior wall are oriented such that the first battery compartment and the second battery compartment are both adjacent the battery monitoring unit compartment.

18. The method in accordance with claim 14 further comprising a first electrical circuit within the first battery compartment and a second electrical circuit within the second battery compartment, wherein restricting propagation of an electrical fault comprises electrically isolating the first electrical circuit and the second electrical circuit from each other within respective compartments of the first battery compartment and the second battery compartment.

19. The battery housing in accordance with claim 2, wherein said at least one partition is formed from the material of said flame arrestor such that said at least one partition and said flame arrestor are co-extensive.

20. The battery assembly in accordance with claim 13, wherein said at least one partition is formed from the material of said flame arrestor such that said at least one partition and said flame arrestor are co-extensive.

* * * * *